(12) United States Patent
Ohguchi et al.

(10) Patent No.: US 10,727,708 B2
(45) Date of Patent: Jul. 28, 2020

(54) ROTOR AND PERMANENT MAGNET TYPE ROTATING ELECTRICAL MACHINE

(71) Applicant: FUJI ELECTRIC CO., LTD., Kawasaki (JP)

(72) Inventors: Hideki Ohguchi, Hino (JP); Hitoshi Nakazono, Suzuka (JP); Hideki Nishikawa, Kameyama (JP); Toshiya Sasaki, Suzuka (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 339 days.

(21) Appl. No.: 15/636,292

(22) Filed: Jun. 28, 2017

(65) Prior Publication Data
US 2018/0048197 A1 Feb. 15, 2018

(30) Foreign Application Priority Data
Aug. 10, 2016 (JP) .................. 2016-157898

(51) Int. Cl.
*H02K 1/27* (2006.01)
*H02K 21/14* (2006.01)
*H02K 1/16* (2006.01)

(52) U.S. Cl.
CPC ............. *H02K 1/276* (2013.01); *H02K 21/14* (2013.01); *H02K 1/16* (2013.01)

(58) Field of Classification Search
CPC ........... H02K 1/276; H02K 1/16; H02K 21/14
See application file for complete search history.

(56) References Cited

U.S. PATENT DOCUMENTS

| 5,581,140 A | 12/1996 | Futami et al. |
| 8,680,732 B2 * | 3/2014 | Kamei .................. H02K 1/276 |
| | | 310/156.53 |

(Continued)

FOREIGN PATENT DOCUMENTS

| EP | 2602911 A1 | 6/2013 |
| JP | 6-133479 | 5/1994 |

(Continued)

OTHER PUBLICATIONS

Notice for Reasons for Refusal dated May 26, 2020 in Japanese Patent Application No. 2016-157898 (10 pages total including English language translation).

*Primary Examiner* — Bernard Rojas

(57) ABSTRACT

Magnet slot includes a permanent magnet insertion portion and air regions that is formed at both circumferential direction ends of the permanent magnet insertion portion. The air region includes a first circumferentially extending portion that extends from a circumferentially end portion of the permanent magnet insertion portion to a circumferentially outer side, a radially extending portion that extends from the first circumferentially extending portion to a radially inner side, and a second circumferentially extending portion that extends from the radially extending portion to a circumferentially inner side until reaching between the radially inner peripheral surface of the permanent magnet insertion portion and the shaft hole. A radially inner end surface of the radially extending portion and a radially inner end surface of the second circumferentially extending portion are made up of a portion of a circular arc in contact with the circumferentially outer side surface of the radially extending portion.

15 Claims, 6 Drawing Sheets

(56) References Cited

U.S. PATENT DOCUMENTS

| | | | |
|---|---|---|---|
| 8,847,454 B2 | 9/2014 | Saito et al. | |
| 9,276,443 B2 * | 3/2016 | Saito | H02K 1/2706 |
| 9,692,264 B2 * | 6/2017 | Yabe | H02K 1/276 |
| 9,985,485 B2 * | 5/2018 | Pandi | H02K 1/276 |
| 2009/0115279 A1 * | 5/2009 | Spaggiari | H02K 1/276 |
| | | | 310/156.53 |
| 2012/0274169 A1 | 11/2012 | Saito et al. | |
| 2013/0313933 A1 * | 11/2013 | Kawasaki | H02K 1/276 |
| | | | 310/156.11 |
| 2019/0097509 A1 * | 3/2019 | Oguchi | H02K 1/2766 |
| 2019/0140532 A1 * | 5/2019 | Wang | H02K 29/08 |

FOREIGN PATENT DOCUMENTS

| | | |
|---|---|---|
| JP | 2010-88219 | 4/2010 |
| JP | 2011-97754 A | 5/2011 |
| JP | 2011-101504 A | 5/2011 |

\* cited by examiner

ROTOR AND PERMANENT MAGNET TYPE ROTATING ELECTRICAL MACHINE

CROSS REFERENCE TO RELATED APPLICATIONS AND INCORPORATION BY REFERENCE

This application claims benefit of priority under 35 USC 119 based on Japanese Patent Application No. 2016-157898 filed on Aug. 10, 2016, the entire contents of which are incorporated by reference herein.

TECHNICAL FIELD

The present invention relates to a rotor that enables stress concentration due to centrifugal force in high-speed rotation to be relaxed and a permanent magnet type rotating electrical machine that includes the rotor.

BACKGROUND ART

As a conventional permanent magnet embedded type rotor of this type, for example, the one disclosed in JP 2010-88219-A has been known.

A permanent magnet embedded type rotor disclosed in JP 2010-88219-A includes a rotor iron core that is formed by laminating electromagnetic steel sheets, a plurality of magnet insertion holes that are formed along the outer peripheral portion of the rotor iron core, and a plurality of permanent magnets that are embedded in the plurality of magnet insertion hole. Each magnet insertion hole is formed into a substantially C-shape as a whole, and both ends of each magnet insertion hole form air regions that bend to the radially inner side of the rotor iron core and the circumferentially end portions of which, where no permanent magnet exists, are formed into a circular arc shape. The air regions are configured to be arranged closer to the shaft hole side than the outer peripheral side surface of the permanent magnet and to extend to the shaft hole side beyond the inner peripheral side surface of the permanent magnet. Specifically, the circumferentially end portion of each air region is made up of a portion of a circular arc in contact with an outer peripheral side straight line portion of the magnet insertion hole, and the radially inner side end of each air region is made up of a portion of a circular arc that has a small radius and is in contact with a portion of the circular arc composing the circumferentially end portion.

The permanent magnet embedded type rotor disclosed in JP 2010-88219-A enables stress concentration due to centrifugal force in high-speed rotation to be relaxed.

SUMMARY OF INVENTION

However, the conventional permanent magnet embedded type rotor disclosed in JP 2010-88219-A has a problem described below.

That is, when the permanent magnet embedded type rotor rotates at a high speed, stress is concentrated to the greatest extent on the circular arc composing the radially inner side end of each air region that is nearest to the shaft hole within the air region. However, since the circular arc composing the radially inner side end of the air region has a small radius, a sufficient relaxation effect of stress concentration cannot be achieved.

Accordingly, the present invention is made to solve the conventional problem, and an object of the present invention is to provide a rotor that enables stress concentration due to centrifugal force in high-speed rotation to be sufficiently relaxed and a permanent magnet type rotating electrical machine that includes the rotor.

In order to achieve the above-described object, according to an aspect of the present invention, there is provided with a rotor, including: a rotor core that has a cylindrical shape and along the outer peripheral portion of which a plurality of magnet slots are arranged centered around a shaft hole; and a plurality of permanent magnets each of which is embedded in one of the plurality of magnet slots, wherein each of the plurality of magnet slots includes a permanent magnet insertion portion that includes a radially outer peripheral surface and a radially inner peripheral surface that extend long and narrow in a circumferential direction, and a pair of air regions that are formed at both circumferential direction ends of the permanent magnet insertion portion, each of the pair of air regions includes a first circumferentially extending portion that extends from a circumferentially end portion of the permanent magnet insertion portion to a circumferentially outer side, a radially extending portion that extends from the first circumferentially extending portion to a radially inner side until reaching a shaft hole side beyond the radially inner peripheral surface of the permanent magnet insertion portion, and that includes a circumferentially outer side surface formed linearly, and a second circumferentially extending portion that extends from the radially extending portion to a circumferentially inner side until reaching between the radially inner peripheral surface of the permanent magnet insertion portion and the shaft hole, and a radially inner end surface of the radially extending portion and a radially inner end surface of the second circumferentially extending portion are made up of a portion of a circular arc in contact with the linearly-formed circumferentially outer side surface of the radially extending portion.

According to another aspect of the present invention, there is provided with a permanent magnet type rotating electrical machine, including: a stator on which a stator winding is wound; and a rotor described above, the rotor being arranged on an inner peripheral side of the stator in a freely rotatable manner.

According to the rotor and the permanent magnet type rotating electrical machine according to the present invention, a rotor that enables stress concentration due to centrifugal force in high-speed rotation to be sufficiently relaxed and a permanent magnet type rotating electrical machine that includes the rotor can be provided.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Embodiments of the present invention will now be described with reference to the drawings.

First Embodiment

Figure 1:
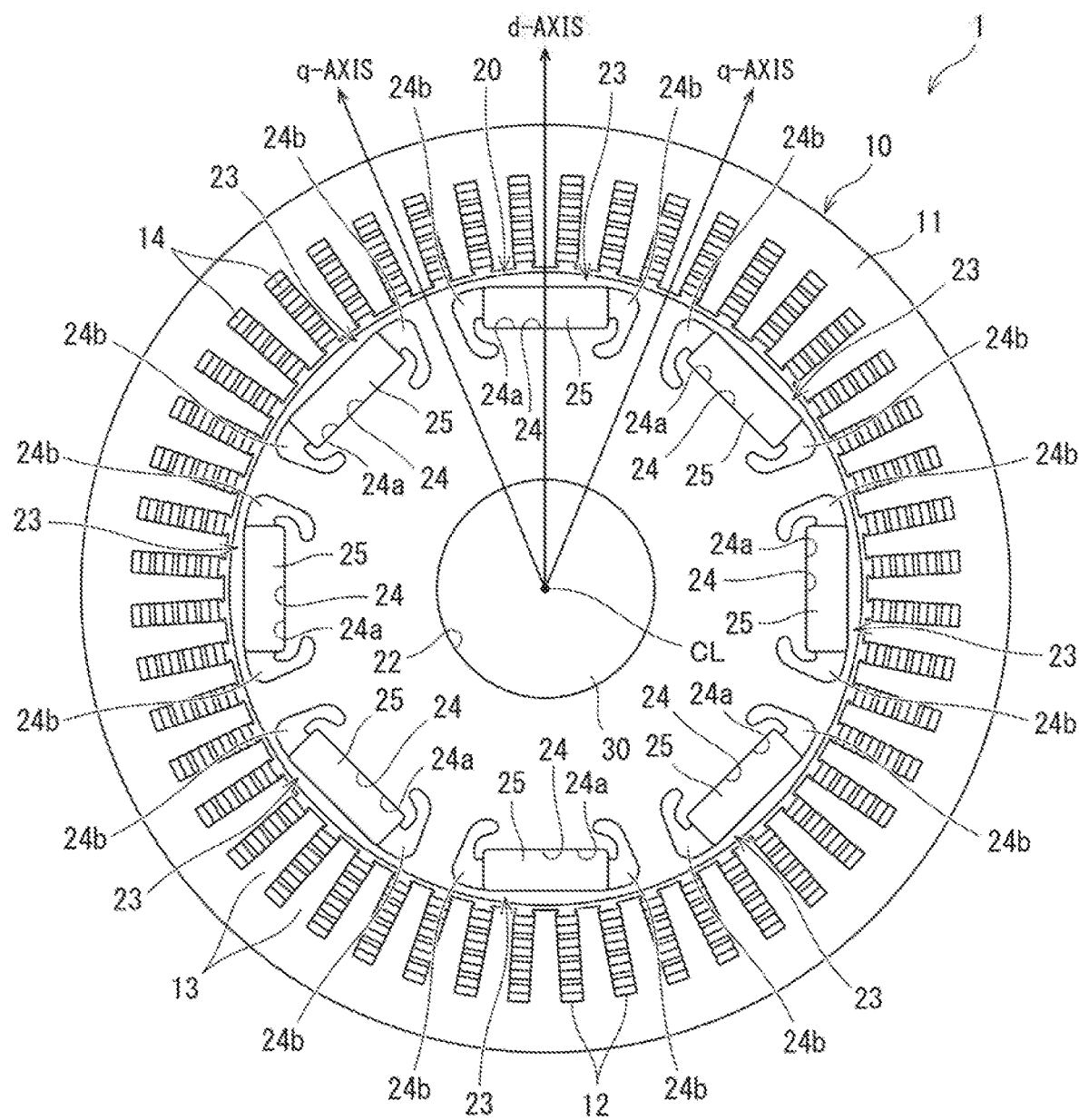
FIG. 1 is a cross-sectional view illustrative of a schematic configuration of a permanent magnet type rotating electrical machine including a rotor according to a first embodiment of the present invention.

A permanent magnet type rotating electrical machine including a rotor according to a first embodiment of the present invention is illustrated in FIG. 1, and a permanent magnet type rotating electrical machine 1 is an 8-pole 48-slot embedded magnet type synchronous motor. The present invention is not restricted in any way by the number of poles, the number of slots, other dimensions of respective portions, and the like.

The permanent magnet type rotating electrical machine 1 illustrated in FIG. 1 includes a stator 10 and a rotor 20 that is arranged on the inner peripheral side of the stator 10 in a freely rotatable manner.

The stator 10 includes a stator core 11 that has a cylindrical shape. On the inner peripheral surface side of the stator core 11, 48 slots 12 and 48 magnetic pole teeth 13 are formed at equal intervals in the circumferential direction. To each slot 12, a plurality of stator windings 14 are installed.

Figure 2:
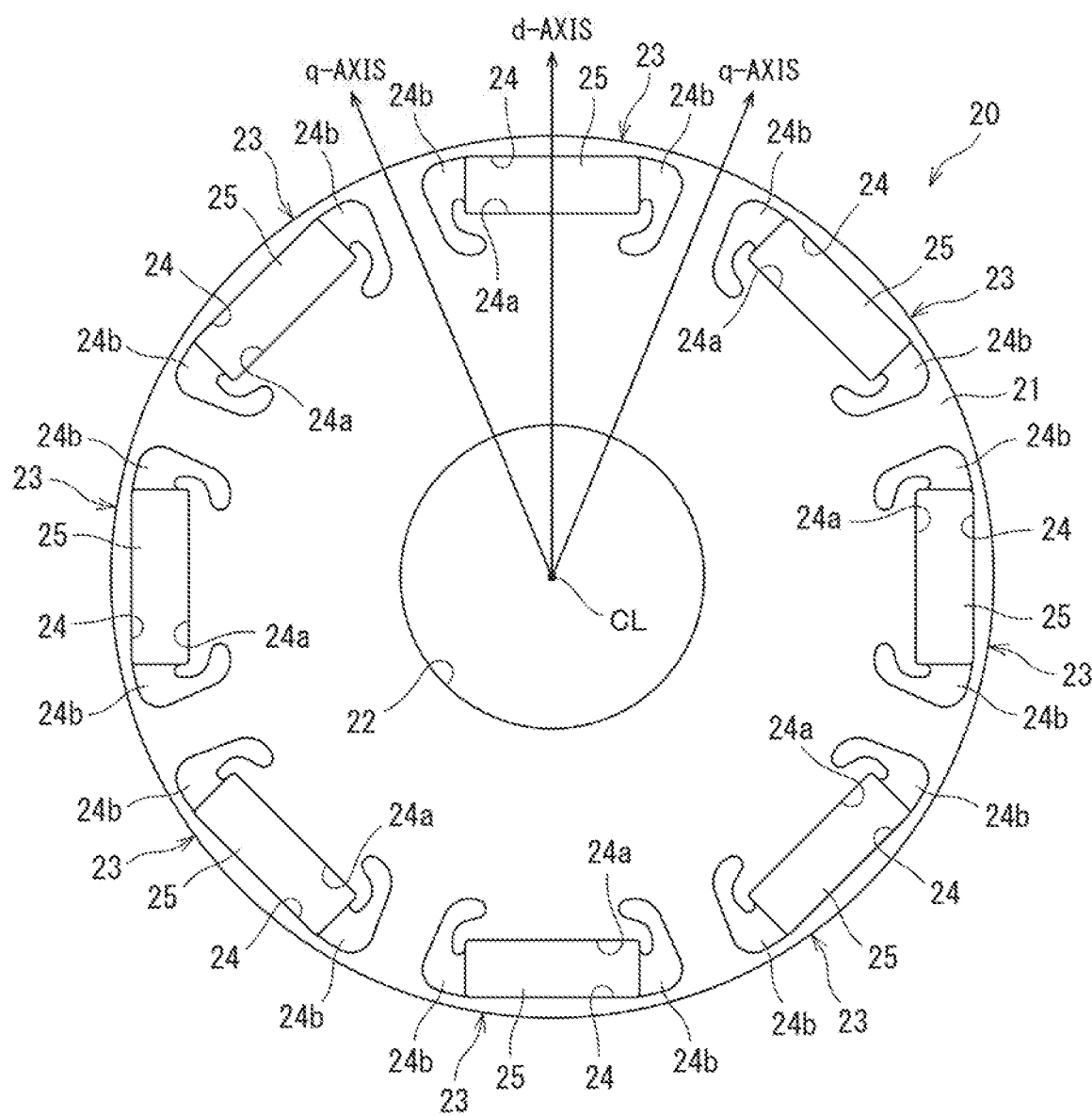
FIG. 2 is a cross-sectional view of the rotor in the permanent magnet type rotating electrical machine illustrated in FIG. 1.
Figure 3:
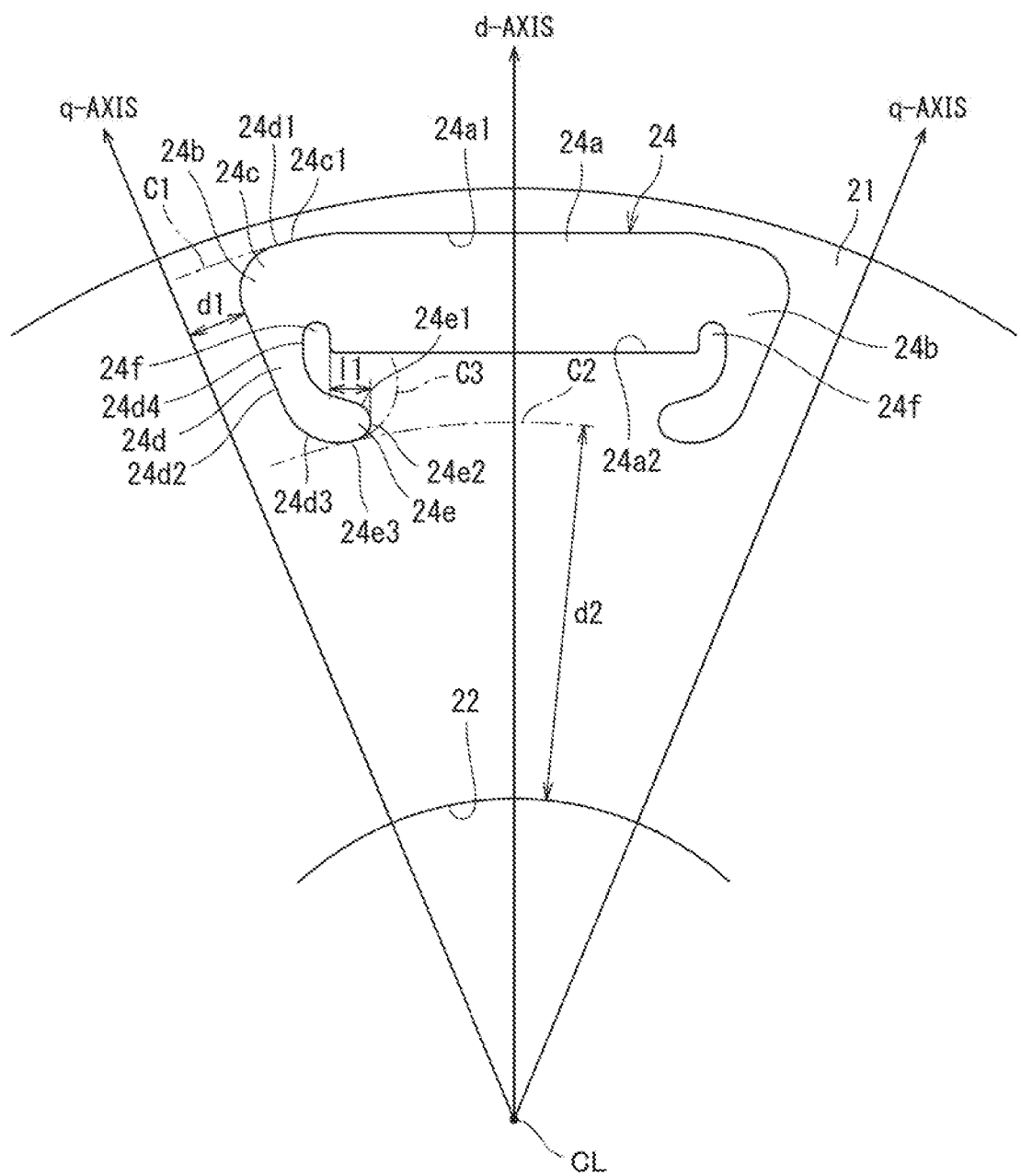
FIG. 3 is an enlarged cross-sectional view illustrative of a magnet slot of one magnetic pole in a rotor core of the rotor illustrated in FIG. 2.

As illustrated in FIGS. 1 to 3, the rotor 20 is formed in a cylindrical shape with a shaft hole 22 formed at the center and includes a rotor core 21 that is made of a laminated iron core and eight magnetic poles 23 that are formed in the rotor core 21. A rotating shaft 30 is fitted and fixed to the shaft hole 22 of the rotor core 21, and the rotor 20 is rotated by the rotating shaft 30.

Each of the eight magnetic poles 23 includes a magnet slot 24 that is arranged along the outer peripheral portion of the rotor core 21. Each magnet slot 24 is formed of a through hole that penetrates from one axial end to the other axial end of the rotor core 21.

As illustrated in FIG. 3, each magnet slot 24 includes a permanent magnet insertion portion 24a that has a rectangular shape, includes a radially outer peripheral surface 24a1 and a radially inner peripheral surface 24a2 that extend long and narrow in the circumferential direction of the rotor core 21 and a pair of air regions 24b that are formed at both circumferential direction ends of the permanent magnet insertion portion 24a. As illustrated in FIGS. 1 and 2, into the permanent magnet insertion portion 24a, a permanent magnet 25 with a rectangular cross-section is embedded. At both circumferentially end portions of the radially inner peripheral surface 24a2 of the permanent magnet insertion portion 24a, a pair of stoppers 24f that protrude to the radially outer side are formed. The stoppers 24f restrict movements of the permanent magnet 25, which is embedded in the permanent magnet insertion portion 24a, to both sides thereof in the circumferential direction.

As illustrated in FIG. 3, each of the pair of air regions 24b includes a first circumferentially extending portion 24c that extends from a circumferentially end portion of the permanent magnet insertion portion 24a to the circumferentially outer side (in FIG. 3, the left side at the left end portion of the permanent magnet insertion portion 24a and the right side at the right end portion of the permanent magnet insertion portion 24a), a radially extending portion 24d that extends from the first circumferentially extending portion 24c to the radially inner side until reaching the side where the shaft hole 22 is disposed beyond the radially inner peripheral surface 24a2 of the permanent magnet insertion portion 24a, and a second circumferentially extending portion 24e that extends from the radially extending portion 24d to the circumferentially inner side until reaching between the radially inner peripheral surface 24a2 of the permanent magnet insertion portion 24a and the shaft hole 22. Since the second circumferentially extending portion 24e extends until reaching between the radially inner peripheral surface 24a2 of the permanent magnet insertion portion 24a and the shaft hole 22, the second circumferentially extending portion 24e protrudes to the circumferentially inner side beyond a circumferentially end surface of the permanent magnet insertion portion 24a (a circumferentially inner side surface of the stopper 24f) by a length l1, as illustrated in FIG. 3. The protrusion length l1 is, as will be described later, determined appropriately in consideration of relaxation effect of stress concentration and the degree of deterioration in magnetic characteristics.

Further, a radially outer peripheral surface 24c1 of the first circumferentially extending portion 24c and a radially outer peripheral surface 24d1 of the radially extending portion 24d are made up of a portion of a circular arc C1 that is concentric with the rotor core 21 and in contact with the radially outer peripheral surface 24a1 of the permanent magnet insertion portion 24a. The center of the circular arc C1 is identical to a center CL of the rotor core 21.

In addition, a circumferentially outer side surface 24d2 of the radially extending portion 24d is formed linearly distanced from a q-axis by a distance d1, as illustrated in FIG. 3. The distance d1 has a magnitude that is appropriately determined to keep a proper distance from an adjacent magnet slot 24. However, the distance d1 is preferably made as small as possible to increase the radius of a circular arc C3, which will be described later.

Further, an R-face is formed with a radius that is appropriately determined so that the R-face comes into contact with both a portion of the circular arc C1, which composes the radially outer peripheral surface 24c1 of the first circumferentially extending portion 24c and the radially outer peripheral surface 24d1 of the radially extending portion 24d, and the circumferentially outer side surface 24d2 of the radially extending portion 24d.

In addition, a radially inner end surface 24d3 of the radially extending portion 24d and a radially inner end surface 24e3 of the second circumferentially extending portion 24e are made up of a portion of the circular arc C3 that is in contact with both the linearly-formed circumferentially outer side surface 24d2 of the radially extending portion 24d and a concentric circle C2 that is concentric with the shaft hole 22 and is distanced from the shaft hole 22 to the radially outer side by a predetermined distance d2 that enables a minimum mechanical strength of the rotor core 21 to be secured.

In the above, the magnitude of the radius of the circular arc C3 is an important point for increasing relaxation effect of stress concentration on the vicinity of the radially inner end surface 24d3 of the radially extending portion 24d, and, the larger the radius of the circular arc C3, the greater becomes the relaxation effect of stress concentration. Therefore, to increase the magnitude of the radius of the circular arc C3, it is preferable to decrease the distance d1 between the linearly-formed circumferentially outer side surface 24d2 of the radially extending portion 24d and a q-axis, to decrease the radius of the concentric circle C2 of the shaft hole 22, and to increase the protrusion length l1 of the second circumferentially extending portion 24e.

However, there is an inconvenience that decreasing the afore-described distance d1 causes a gap with an adjacent magnet slot 24 to be narrow and mechanical strength to decrease. Therefore, in consideration of both the mechanical strength of and stress relaxation effect for the rotor core 21, the magnitude of the distance d1 is appropriately determined.

Further, decreasing the radius of the concentric circle C2 of the shaft hole 22 causes the distance d2 between the shaft hole 22 and the radially inner end surface 24e3 of the second circumferentially extending portion 24e to be short and the mechanical strength of the rotor core 21 to decrease. Therefore, in consideration of the mechanical strength of the rotor core 21, the magnitude of the radius of the concentric circle C2 of the shaft hole 22, that is, the predetermined distance d2 from the shaft hole 22, is set at a distance that enables a minimum mechanical strength of the rotor core 21 to be secured.

Furthermore, since increasing the length l1 by which the second circumferentially extending portion 24e protrudes causes a distance between the second circumferentially extending portions 24e of the pair of air regions 24b to be short, a gap through which magnetic flux passes becomes short, causing magnetic characteristics to deteriorate. Therefore, the length l1 by which the second circumferentially extending portion 24e protrudes is appropriately determined in consideration of relaxation effect of stress concentration and the degree of deterioration in magnetic characteristics.

Moreover, a radially outer side surface 24e1 of the second circumferentially extending portion 24e is formed linearly in parallel with the radially inner peripheral surface 24a2 of the permanent magnet insertion portion 24a in consideration of the radial direction width of the second circumferentially extending portion 24e. An R-face is formed that is in contact with both the linearly-formed radially outer side surface 24e1 of the second circumferentially extending portion 24e and the circular arc C3 composing the radially inner end surface 24e3 of the second circumferentially extending portion 24e, the R-face forming a circumferentially inner side surface 24e2 of the second circumferentially extending portion 24e.

In addition, in each air region 24b, a circumferentially outer side surface of the stopper 24f, that is, a circumferentially inner side surface 24d4 of the radially extending portion 24d, and the radially outer side surface 24e1 of the second circumferentially extending portion 24e are linked with each other by a circular arc in contact with both thereof.

In the permanent magnet type rotating electrical machine 1, which is configured as described above, when the rotor 20 rotates at a high speed (for example, approximately 5400 rpm), centrifugal force causes relatively large stress to be concentrated on, in particular, the vicinities of the radially outer peripheral surface 24c1 of the first circumferentially extending portion 24c and the radially outer peripheral surface 24d1 of the radially extending portion 24d and the vicinity of the radially inner end surface 24d3 of the radially extending portion 24d in each air region 24b.

The radially inner end surface 24d3 of the radially extending portion 24d and the radially inner end surface 24e3 of the second circumferentially extending portion 24e, which extends from the radially extending portion 24d to the circumferentially inner side until reaching between the radially inner peripheral surface 24a2 of the permanent magnet insertion portion 24a and the shaft hole 22, are made up of a portion of the circular arc C3 that is in contact with the linearly-formed circumferentially outer side surface 24d2 of the radially extending portion 24d. Therefore, a relatively large radius of a circular arc that is formed to the radially inner end surface 24d3 of the radially extending portion 24d enables stress concentration on the vicinity of the radially inner end surface 24d3 of the radially extending portion 24d due to centrifugal force to be appropriately relaxed.

In addition, since being made up of a portion of the circular arc C1, which is concentric with the rotor core 21 and in contact with the radially outer peripheral surface 24a1 of the permanent magnet insertion portion 24a, the radially outer peripheral surface 24c1 of the first circumferentially extending portion 24c and the radially outer peripheral surface 24d1 of the radially extending portion 24d are made up of a portion of a relatively large circular arc that enables stress concentration on the vicinities of the radially outer peripheral surface 24c1 of the first circumferentially extending portion 24c and the radially outer peripheral surface 24d1 of the radially extending portion 24d to be appropriately relaxed.

Furthermore, since the circular arc C3 is a circular arc that is in contact with both the linearly-formed circumferentially outer side surface 24d2 of the radially extending portion 24d and the concentric circle C2 of the shaft hole 22, which is distanced from the shaft hole 22 to the radially outer side by the predetermined distance d2, which enables a minimum mechanical strength of the rotor core 21 to be secured, it is possible not only to appropriately relax stress concentration on the vicinity of the radially inner end surface 24d3 of the radially extending portion 24d but also to secure a minimum mechanical strength of the rotor core 21.

Second Embodiment

Figure 4:
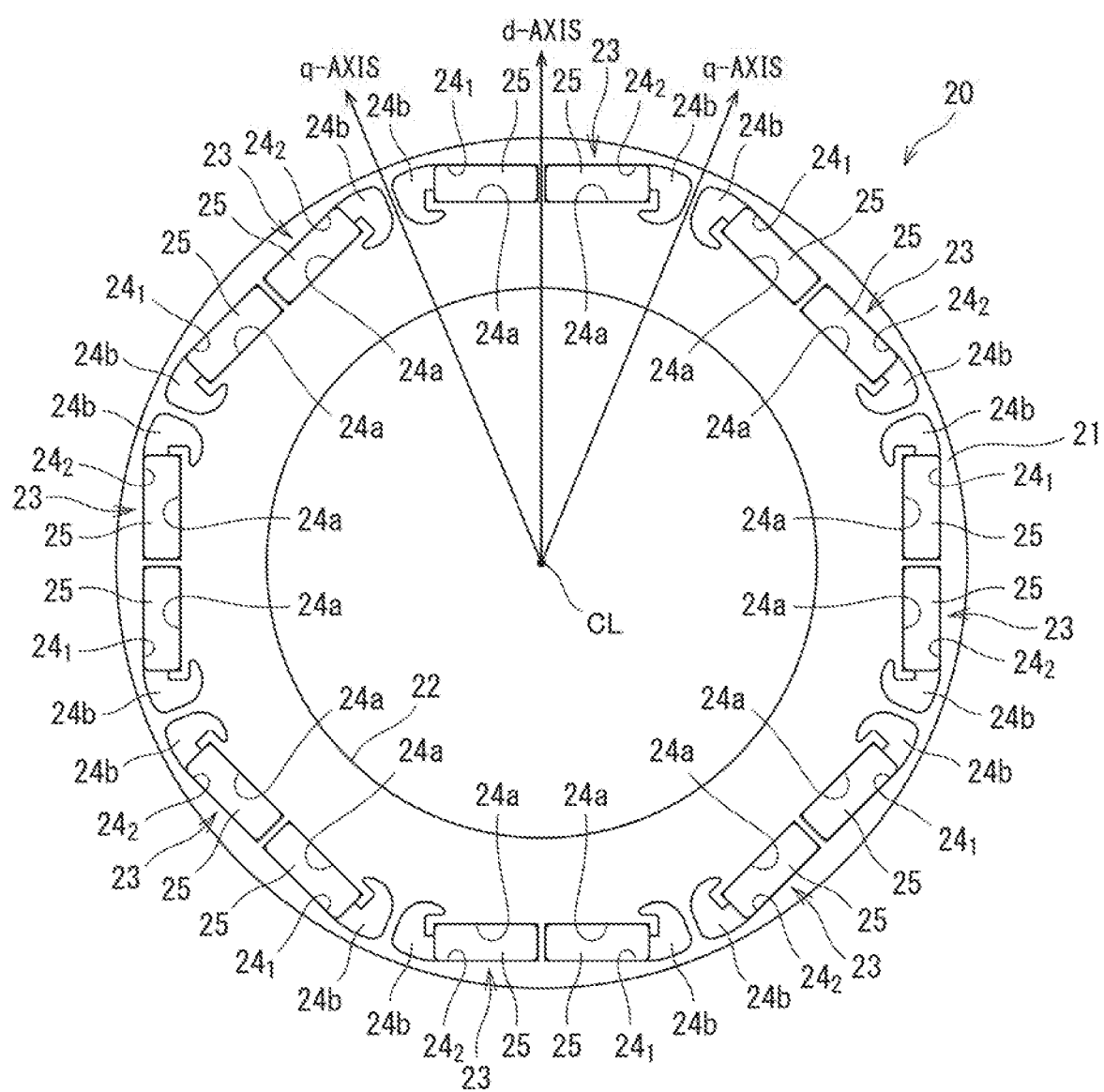
FIG. 4 is a cross-sectional view illustrative of a schematic configuration of a rotor according to a second embodiment of the present invention.
Figure 5:
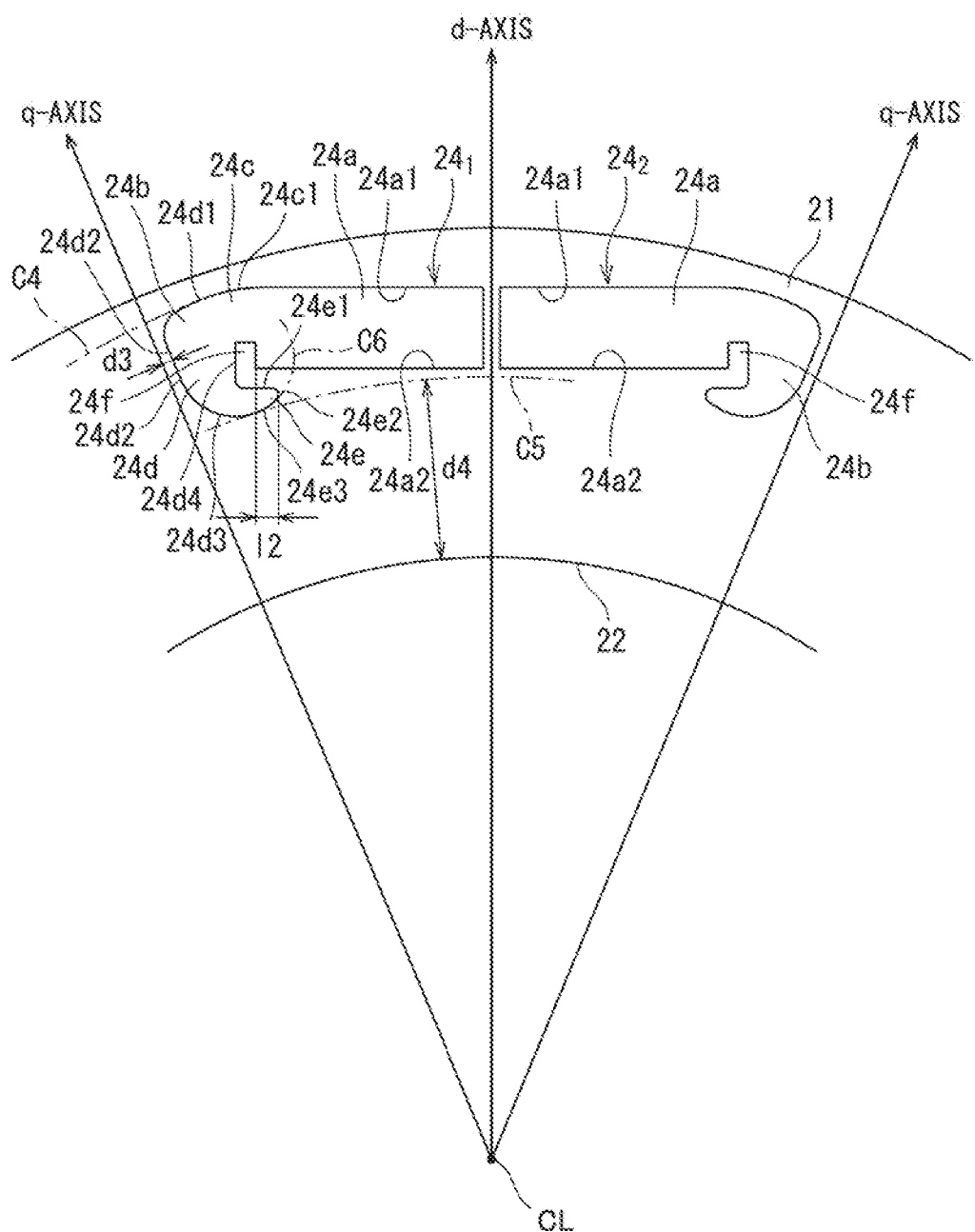
FIG. 5 is an enlarged cross-sectional view illustrative of a magnet slot of one magnetic pole in a rotor core of the rotor illustrated in FIG. 4.

Next, a rotor according to a second embodiment of the present invention will be described with reference to FIGS. 4 and 5. In FIGS. 4 and 5, the same signs are assigned to the same members as those in FIGS. 2 and 3 and a description thereof will be sometimes omitted.

Although a rotor 20 illustrated in FIG. 4 has the same basic configuration as that of the rotor 20 illustrated in FIG. 2, the rotor 20 illustrated in FIG. 4 differs from the rotor 20 illustrated in FIG. 2 in that each of a plurality (eight) of magnet slots 24 illustrated in FIG. 2 is halved at a circumferentially central portion of a permanent magnet insertion portion 24a by a partition wall 21a into a circumferentially left side and a circumferentially right side to be made up of two magnet slots $24_1$ and $24_2$.

Specifically, as illustrated in FIG. 5, the magnet slot $24_1$ on the circumferentially left side of the partition includes a permanent magnet insertion portion 24a that has a rectangular shape, includes a radially outer peripheral surface 24a1 and a radially inner peripheral surface 24a2 that extend long and narrow in the circumferential direction of a rotor core 21 and an air region 24b that is formed at the circumferentially left end of the permanent magnet insertion portion 24a. In addition, the magnet slot $24_2$ on the circumferentially right side of the partition includes a permanent magnet insertion portion 24a that has a rectangular shape, includes a radially outer peripheral surface 24a1 and a radially inner peripheral surface 24a2 that extend long and narrow in the circumferential direction of the rotor core 21 and an air region 24b that is formed at the circumferentially right end of the permanent magnet insertion portion 24a.

As illustrated in FIG. 4, permanent magnets 25 with a rectangular cross-section are embedded into the permanent magnet insertion portion 24a of the magnet slot $24_1$ on the circumferentially left side and the permanent magnet insertion portion 24a of the magnet slot $24_2$ on the circumferentially right side, respectively. The circumferential direction length of each permanent magnet 25 is set at approximately a half of the circumferential direction length of the permanent magnet 25 illustrated in FIG. 2 in accordance with the circumferential direction length of the corresponding permanent magnet insertion portion 24a. Stoppers 24f that protrude to the radially outer side are formed at a circumferentially left end portion of the radially inner peripheral surface 24a2 in the permanent magnet insertion portion 24a of the magnet slot $24_1$ and a circumferentially right end portion of the radially inner peripheral surface 24a2 in the permanent magnet insertion portion 24a of the magnet slot $24_2$, respectively.

Since the air region 24b on the side where the magnet slot $24_1$ is disposed and the air region 24b on the side where the magnet slot $24_2$ is disposed have line-symmetrical shapes, only the air region 24b on the side where the magnet slot $24_1$ is disposed will be described. As illustrated in FIG. 5, the air region 24b includes a first circumferentially extending portion 24c that extends from a circumferentially left end portion of the permanent magnet insertion portion 24a to the circumferentially outer side (the circumferentially left side), a radially extending portion 24d that extends from the first circumferentially extending portion 24c to the radially inner side until reaching the side where a shaft hole 22 is disposed beyond the radially inner peripheral surface 24a2 of the permanent magnet insertion portion 24a, and a second circumferentially extending portion 24e that extends from the radially extending portion 24d to the circumferentially inner side until reaching between the radially inner peripheral surface 24a2 of the permanent magnet insertion portion 24a and the shaft hole 22. Since the second circumferentially extending portion 24e extends until reaching between the radially inner peripheral surface 24a2 of the permanent magnet insertion portion 24a and the shaft hole 22, the second circumferentially extending portion 24e protrudes to the circumferentially inner side beyond a circumferentially end surface of the permanent magnet insertion portion 24a (a circumferentially inner side surface of the stopper 24f) by a length 12, as illustrated in FIG. 5. The protrusion length 12 is, as with the afore-described length 11, determined appropriately in consideration of relaxation effect of stress concentration and the degree of deterioration in magnetic characteristics.

Further, a radially outer peripheral surface 24c1 of the first circumferentially extending portion 24c and a radially outer peripheral surface 24d1 of the radially extending portion 24d are made up of a portion of a circular arc C4 that is concentric with the rotor core 21 and in contact with the radially outer peripheral surface 24a1 of the permanent magnet insertion portion 24a. The center of the circular arc C4 is identical to a center CL of the rotor core 21.

In addition, a circumferentially outer side surface 24d2 of the radially extending portion 24d is formed linearly distanced from a q-axis by a distance d3, as illustrated in FIG. 5. The distance d3 has a magnitude that is appropriately determined to keep a proper distance from an adjacent magnet slot 24. However, the distance d3 is preferably made as small as possible to increase the radius of a circular arc C6, which will be described later.

Further, an R-face is formed with a radius that is appropriately determined so that the R-face comes into contact with both a portion of the circular arc C4, which composes the radially outer peripheral surface 24c1 of the first circumferentially extending portion 24c and the radially outer peripheral surface 24d1 of the radially extending portion 24d, and the circumferentially outer side surface 24d2 of the radially extending portion 24d.

In addition, a radially inner end surface 24d3 of the radially extending portion 24d and a radially inner end surface 24e3 of the second circumferentially extending portion 24e are made up of a portion of the circular arc C6 that is in contact with both the linearly-formed circumferentially outer side surface 24d2 of the radially extending portion 24d and a concentric circle C5 that is concentric with the shaft hole 22 and is distanced from the shaft hole 22 to the radially outer side by a predetermined distance d4 that enables a minimum mechanical strength of the rotor core 21 to be secured.

In the above, the magnitude of the radius of the circular arc C6 is, as with the afore-described the circular arc C3, an important point for increasing relaxation effect of stress concentration on the vicinity of the radially inner end surface 24d3 of the radially extending portion 24d, and, the larger the radius of the circular arc C6, the greater becomes the relaxation effect of stress concentration. Therefore, to increase the magnitude of the radius of the circular arc C6, it is preferable to decrease the distance d3 between the linearly-formed circumferentially outer side surface 24d2 of the radially extending portion 24d and a q-axis, to decrease the radius of the concentric circle C5 of the shaft hole 22, and to increase the protrusion length 12 of the second circumferentially extending portion 24e.

However, there is an inconvenience that decreasing the afore-described distance d3 causes a gap with an adjacent magnet slot 24 to be narrow and mechanical strength to decrease. Therefore, in consideration of both the mechanical strength of and stress relaxation effect for the rotor core 21, the magnitude of the distance d3 is appropriately determined.

Further, decreasing the radius of the concentric circle C5 of the shaft hole 22 causes the distance d4 between the shaft hole 22 and the radially inner end surface 24e3 of the second circumferentially extending portion 24e to be short and the mechanical strength of the rotor core 21 to decrease. Therefore, in consideration of the mechanical strength of the rotor core 21, the magnitude of the radius of the concentric circle C5 of the shaft hole 22, that is, the predetermined distance d4 from the shaft hole 22, is set at a distance that enables a minimum mechanical strength of the rotor core 21 to be secured.

Furthermore, since increasing the length 12 by which the second circumferentially extending portion 24e protrudes causes a distance between the second circumferentially extending portions 24e of the pair of air regions 24b to be short, a gap through which magnetic flux passes becomes short, causing magnetic characteristics to deteriorate. Therefore, the length 12 by which the second circumferentially extending portion 24e protrudes is appropriately determined in consideration of relaxation effect of stress concentration and the degree of deterioration in magnetic characteristics.

Moreover, a radially outer side surface 24e1 of the second circumferentially extending portion 24e is formed linearly in parallel with the radially inner peripheral surface 24a2 of the permanent magnet insertion portion 24a in consideration of the radial direction width of the second circumferentially extending portion 24e. An R-face is formed that is in contact with both the linearly-formed radially outer side surface 24e1 of the second circumferentially extending portion 24e and the circular arc C3 composing the radially inner end surface 24e3 of the second circumferentially extending portion 24e, the R-face forming a circumferentially inner side surface 24e2 of the second circumferentially extending portion 24e.

In addition, in each air region 24b, a circumferentially outer side surface of the stopper 24f, that is, a circumferentially inner side surface 24d4 of the radially extending portion 24d, and the radially outer side surface 24e1 of the second circumferentially extending portion 24e are linked with each other by a small circular arc in contact with both thereof.

In a permanent magnet type rotating electrical machine 1 that is configured as described above, the radially inner end surface 24d3 of the radially extending portion 24d and the radially inner end surface 24e3 of the second circumferentially extending portion 24e, which extends from the radially extending portion 24d to the circumferentially inner side until reaching between the radially inner peripheral surface 24a2 of the permanent magnet insertion portion 24a and the shaft hole 22, are also made up of a portion of the circular arc C6 in contact with the linearly-formed circumferentially outer side surface 24d2 of the radially extending portion 24d. Therefore, a relatively large radius of a circular arc that is formed to the radially inner end surface 24d3 of the radially extending portion 24d enables stress concentration on the vicinity of the radially inner end surface 24d3 of the radially extending portion 24d due to centrifugal force to be appropriately relaxed.

In addition, since being made up of a portion of the circular arc C4, which is concentric with the rotor core 21 and in contact with the radially outer peripheral surface 24a1 of the permanent magnet insertion portion 24a, the radially outer peripheral surface 24c1 of the first circumferentially extending portion 24c and the radially outer peripheral surface 24d1 of the radially extending portion 24d are made up of a portion of a relatively large circular arc that enables stress concentration on the vicinities of the radially outer peripheral surface 24c1 of the first circumferentially extending portion 24c and the radially outer peripheral surface 24d1 of the radially extending portion 24d to be appropriately relaxed.

Furthermore, since the circular arc C6 is a circular arc that is in contact with both the linearly-formed circumferentially outer side surface 24d2 of the radially extending portion 24d and the concentric circle C5 of the shaft hole 22, which is distanced from the shaft hole 22 to the radially outer side by the predetermined distance d4, which enables a minimum mechanical strength of the rotor core 21 to be secured, it is possible not only to appropriately relax stress concentration on the vicinity of the radially inner end surface 24d3 of the radially extending portion 24d but also to secure a minimum mechanical strength of the rotor core 21.

Third Embodiment

Figure 6:
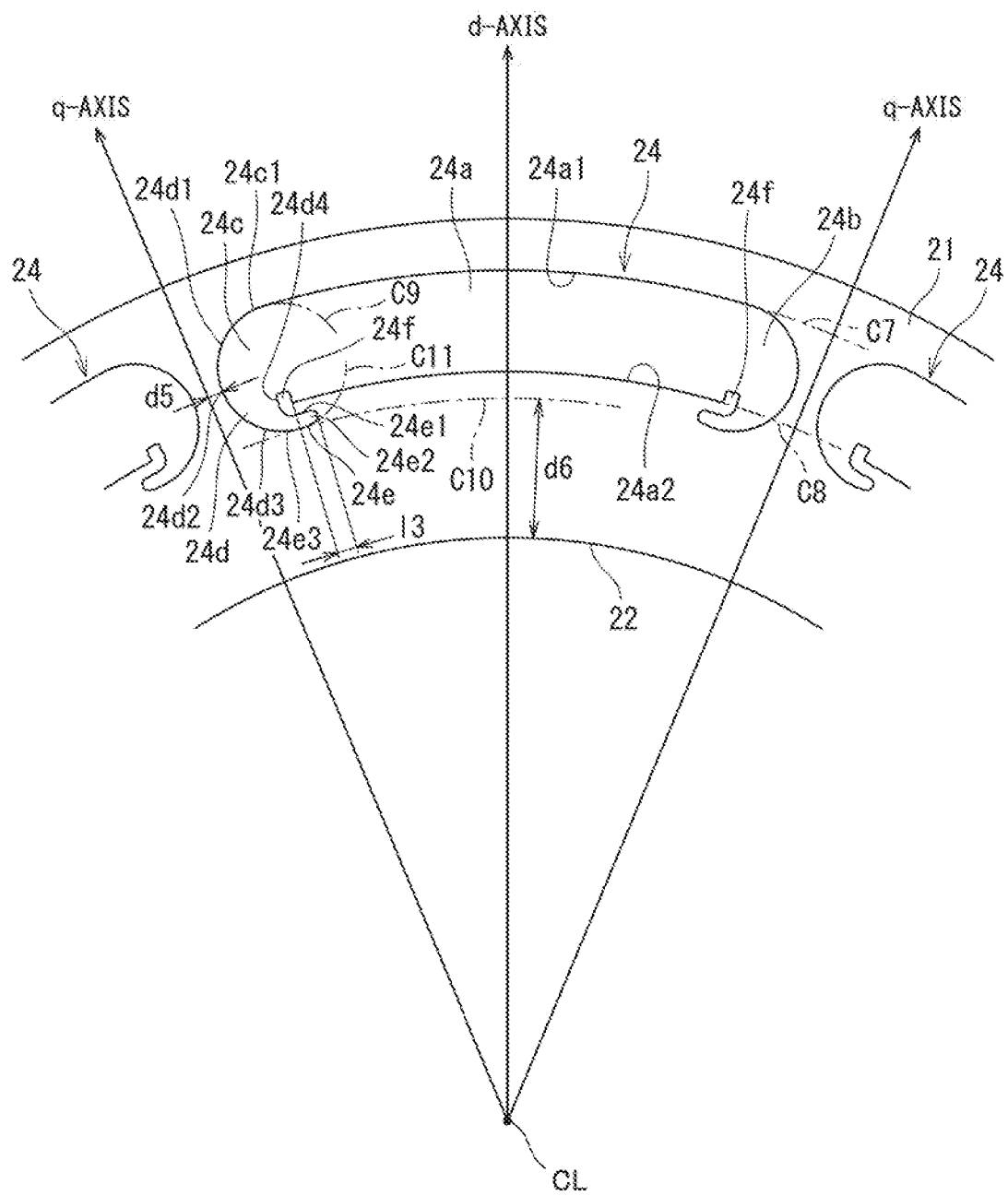
FIG. 6 is a cross-sectional view partially illustrative of a rotor according to a third embodiment of the present invention.

Next, a rotor core that composes a rotor according to a third embodiment of the present invention will be described with reference to FIG. 6. In FIG. 6, the same signs are assigned to the same members as those in FIG. 3 and a description thereof will be sometimes omitted.

Although a rotor core 21 illustrated in FIG. 6 has the same basic configuration as that of the rotor core illustrated in FIG. 3, the rotor core 21 illustrated in FIG. 6 differs from the rotor core illustrated in FIG. 3 in the shapes of a permanent magnet insertion portion 24a and an air region 24b in each magnet slot 24.

Specifically, each magnet slot 24 includes a permanent magnet insertion portion 24a that has a rectangular shape, includes a radially outer peripheral surface 24a1 and a radially inner peripheral surface 24a2 that extend long and narrow in the circumferential direction of the rotor core 21 and a pair of air regions 24b that are formed at both circumferential direction ends of the permanent magnet insertion portion 24a.

The permanent magnet insertion portion 24a in each magnet slot 24 is formed into a shape having the radially outer peripheral surface 24a1 made up of a portion of a circular arc C7 that is concentric with the rotor core 21 and the radially inner peripheral surface 24a2 made up of a portion of a circular arc C8 that is concentric with the rotor core 21 and has a smaller radius than that of the radially outer peripheral surface 24a1.

Although not illustrated, into the permanent magnet insertion portion 24a, a permanent magnet the cross-section of which is shaped in accordance with the shape of the permanent magnet insertion portion 24a is embedded. At both circumferentially end portions of the radially inner peripheral surface 24a2 of the permanent magnet insertion portion 24a, a pair of stoppers 24f that protrude to the radially outer side are formed. The stoppers 24f restrict movements of the permanent magnet, which is embedded in the permanent magnet insertion portion 24a, to both sides thereof in the circumferential direction.

In addition, each of the pair of air regions 24b includes a first circumferentially extending portion 24c that extends from a circumferentially end portion of the permanent magnet insertion portion 24a to the circumferentially outer side (in FIG. 6, the left side at the left end portion of the permanent magnet insertion portion 24a and the right side at the right end portion of the permanent magnet insertion portion 24a), a radially extending portion 24d that extends from the first circumferentially extending portion 24c to the radially inner side until reaching the side where a shaft hole 22 is disposed beyond the radially inner peripheral surface 24a2 of the permanent magnet insertion portion 24a, and a second circumferentially extending portion 24e that extends from the radially extending portion 24d to the circumferentially inner side until reaching between the radially inner peripheral surface 24a2 of the permanent magnet insertion portion 24a and the shaft hole 22. Since the second circumferentially extending portion 24e extends until reaching between the radially inner peripheral surface 24a2 of the permanent magnet insertion portion 24a and the shaft hole 22, the second circumferentially extending portion 24e protrudes to the circumferentially inner side beyond a circumferentially end surface of the permanent magnet insertion portion 24a (a circumferentially inner side surface of the stopper 24f) by a length 13, as illustrated in FIG. 6. The protrusion length 13 is, as with the afore-described length 11, determined appropriately in consideration of relaxation effect of stress concentration and the degree of deterioration in magnetic characteristics.

Further, a radially outer peripheral surface 24c1 of the first circumferentially extending portion 24c and a radially outer peripheral surface 24d1 of the radially extending portion 24d are made up of a portion of a circular arc C9 in contact with the radially outer peripheral surface 24a1 of the permanent magnet insertion portion 24a and a linearly-formed circumferentially outer side surface 24d2 of the radially extending portion 24d. Since, in high-speed rotation, stress is concentrated on the vicinities of the radially outer peripheral surface 24c1 of the first circumferentially extending portion 24c and the radially outer peripheral surface 24d1 of the radially extending portion 24d, the radius of the circular arc C9 is preferably made as large as possible.

In addition, a circumferentially outer side surface 24d2 of the radially extending portion 24d is formed linearly distanced from a q-axis by a distance d5, as illustrated in FIG. 6. The distance d5 has a magnitude that is appropriately determined to keep a proper distance from an adjacent magnet slot 24. However, the distance d5 is preferably made as small as possible to increase the radius of the circular arc C9 and a circular arc C11, which will be described later.

In addition, a radially inner end surface 24d3 of the radially extending portion 24d and a radially inner end surface 24e3 of the second circumferentially extending portion 24e are made up of a portion of the circular arc C11 that is in contact with both the linearly-formed circumferentially outer side surface 24d2 of the radially extending portion 24d and a concentric circle C10 that is concentric with the shaft hole 22 and is distanced from the shaft hole 22 to the radially outer side by a predetermined distance d6 that enables a minimum mechanical strength of the rotor core 21 to be secured.

In the above, the magnitude of the radius of the circular arc C11 is an important point for increasing relaxation effect of stress concentration on the vicinity of the radially inner end surface 24d3 of the radially extending portion 24d, and, the larger the radius of the circular arc C11, the greater becomes the relaxation effect of stress concentration. Therefore, to increase the magnitude of the radius of the circular arc C11, it is preferable to decrease the distance d5 between the linearly-formed circumferentially outer side surface 24d2 of the radially extending portion 24d and a q-axis, to decrease the radius of the concentric circle C10 of the shaft hole 22, and to increase the protrusion length 13 of the second circumferentially extending portion 24e.

However, there is an inconvenience that decreasing the afore-described distance d5 causes a gap with an adjacent magnet slot 24 to be narrow and mechanical strength to decrease. Therefore, in consideration of both the mechanical strength of and stress relaxation effect for the rotor core 21, the magnitude of the distance d5 is appropriately determined.

Further, decreasing the radius of the concentric circle C10 of the shaft hole 22 causes the distance d6 between the shaft hole 22 and the radially inner end surface 24e3 of the second circumferentially extending portion 24e to be short and the mechanical strength of the rotor core 21 to decrease. Therefore, in consideration of the mechanical strength of the rotor core 21, the magnitude of the radius of the concentric circle C10 of the shaft hole 22, that is, the predetermined distance d6 from the shaft hole 22, is set at a distance that enables a minimum mechanical strength of the rotor core 21 to be secured.

Furthermore, since increasing the length 13 by which the second circumferentially extending portion 24e protrudes causes a distance between the second circumferentially extending portions 24e of the pair of air regions 24b to be short, a gap through which magnetic flux passes becomes short, causing magnetic characteristics to deteriorate. Therefore, the length 13 by which the second circumferentially extending portion 24e protrudes is appropriately determined in consideration of relaxation effect of stress concentration and the degree of deterioration in magnetic characteristics.

Moreover, a radially outer side surface 24e1 of the second circumferentially extending portion 24e is formed linearly in consideration of the radial direction width of the second circumferentially extending portion 24e. An R-face is formed that is in contact with both the linearly-formed radially outer side surface 24e1 of the second circumferentially extending portion 24e and the circular arc C11 composing the radially inner end surface 24e3 of the second circumferentially extending portion 24e, the R-face forming a circumferentially inner side surface 24e2 of the second circumferentially extending portion 24e.

In addition, in each air region 24b, a circumferentially outer side surface of the stopper 24f, that is, a circumferentially inner side surface 24d4 of the radially extending portion 24d, and the radially outer side surface 24e1 of the second circumferentially extending portion 24e are linked with each other by a circular arc in contact with both thereof.

In a permanent magnet type rotating electrical machine 1 that is configured as described above, the radially inner end surface 24d3 of the radially extending portion 24d and the radially inner end surface 24e3 of the second circumferentially extending portion 24e, which extends from the radially extending portion 24d to the circumferentially inner side until reaching between the radially inner peripheral surface 24a2 of the permanent magnet insertion portion 24a and the shaft hole 22, are also made up of a portion of the circular arc C11 in contact with the linearly-formed circumferentially outer side surface 24d2 of the radially extending portion 24d. Therefore, a relatively large radius of a circular arc that is formed to the radially inner end surface 24d3 of the radially extending portion 24d enables stress concentration on the vicinity of the radially inner end surface 24d3 of the radially extending portion 24d due to centrifugal force to be appropriately relaxed.

Furthermore, since the circular arc C11 is a circular arc that is in contact with both the linearly-formed circumferentially outer side surface 24d2 of the radially extending portion 24d and the concentric circle C10 of the shaft hole 22, which is distanced from the shaft hole 22 to the radially outer side by the predetermined distance d6, which enables a minimum mechanical strength of the rotor core 21 to be secured, it is possible not only to appropriately relax stress concentration on the vicinity of the radially inner end surface 24d3 of the radially extending portion 24d but also to secure a minimum mechanical strength of the rotor core 21.

Describing now the predetermined distances d2, d4, and d6 from the shaft hole 22 in the first to third embodiments in detail, when the rotating shaft 30 is shrink fitted into the rotor core 21, stress applied to the rotor core 21 increases drastically from the concentric circle C2, C5, or C6 toward the shaft hole 22 to reach a maximum value at a portion around the shaft hole 22. The smaller the predetermined distances d2, d4, and d6, the larger becomes the maximum value of stress. Therefore, it is required to secure the predetermined distances d2, d4, and d6 equal to or greater than a distance not causing the maximum value of stress to exceed a stress limit of the rotor core 21.

The present invention was described above through embodiments thereof, but the present invention is not limited to the above embodiments, and various modifications and improvements may be applied thereto.

For example, although, in the rotor 20 according to the first embodiment, illustrated in FIG. 2, one magnet slot 24 and one permanent magnet 25 are arranged with respect to each magnetic pole 23, two magnet slots 24 and two permanent magnets may be arranged with respect to each magnetic pole with the polarities of two permanent magnets 25 arranged to two magnetic poles 23 set to an identical polarity.

In addition, although, in the rotor 20 according to the second embodiment, illustrated in FIGS. 4 and 5, each of a plurality (eight) of magnet slots 24 illustrated in FIG. 2 is halved at a circumferentially central portion of the permanent magnet insertion portion 24a by the partition wall 21a into a circumferentially left side and a circumferentially right side to be made up of two magnet slots $24_1$ and $24_2$, the magnet slots 24 may be partitioned into three or more parts at the permanent magnet insertion portion 24a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Permanent magnet type rotating electrical machine
10 Stator
14 Stator winding
20 Rotor
21 Rotor core
22 Shaft hole
24 Magnet slot
24a Permanent magnet insertion portion
24a1 Radially outer peripheral surface
24a2 Radially inner peripheral surface
24b Air region
24c First circumferentially extending portion
24c1 Radially outer peripheral surface
24d Radially extending portion
24d1 Radially outer peripheral surface
24d2 Circumferentially outer side surface
24d3 Radially inner end surface
24e Second circumferentially extending portion
24e3 Radially inner end surface
25 Permanent magnet
C1, C3, C4, C6, C7, C8, C9, C11 Circular arc
C2, C5, C10 Concentric circle

The invention claimed is:

1. A rotor, comprising:
a rotor core that has a cylindrical shape and along the outer peripheral portion of which a plurality of magnet slots are arranged centered around a shaft hole; and
a plurality of permanent magnets each of which is embedded in one of the plurality of magnet slots,
wherein
each of the plurality of magnet slots includes a permanent magnet insertion portion that includes a radially outer peripheral surface and a radially inner peripheral surface that extend long and narrow in a circumferential direction, and a pair of air regions that are formed at both circumferential direction ends of the permanent magnet insertion portion,
each of the pair of air regions includes a first circumferentially extending portion that extends from a circumferentially end portion of the permanent magnet insertion portion to a circumferentially outer side, a radially extending portion that extends from the first circumferentially extending portion to a radially inner side until reaching a shaft hole side beyond the radially inner peripheral surface of the permanent magnet insertion portion, and that includes a circumferentially outer side surface formed linearly, and a second circumferentially extending portion that extends from the radially extending portion to a circumferentially inner side until reaching between the radially inner peripheral surface of the permanent magnet insertion portion and the shaft hole, so as to protrude to the circumferentially inner side beyond a circumferentially end surface of the permanent magnet insertion portion, and
a radially inner end surface of the radially extending portion and a radially inner end surface of the second circumferentially extending portion are made up of a portion of a circular arc in contact with the linearly-formed circumferentially outer side surface of the radially extending portion.

2. A rotor, comprising:
a rotor core that has a cylindrical shape and along the outer peripheral portion of which a plurality of magnet slots are arranged centered around a shaft hole; and
a plurality of permanent magnets each of which is embedded in one of the plurality of magnet slots,
wherein
each of the plurality of magnet slots includes a permanent magnet insertion portion that includes a radially outer peripheral surface and a radially inner peripheral surface that extend long and narrow in a circumferential direction, and a pair of air regions that are formed at both circumferential direction ends of the permanent magnet insertion portion,
each of the pair of air regions includes a first circumferentially extending portion that extends from a circumferentially end portion of the permanent magnet insertion portion to a circumferentially outer side, a radially extending portion that extends from the first circumferentially extending portion to a radially inner side until reaching a shaft hole side beyond the radially inner peripheral surface of the permanent magnet insertion portion, and that includes a circumferentially outer side surface formed linearly, and a second circumferentially extending portion that extends from the radially extending portion to a circumferentially inner side until reaching between the radially inner peripheral surface of the permanent magnet insertion portion and the shaft hole,
a radially inner end surface of the radially extending portion and a radially inner end surface of the second circumferentially extending portion are made up of a portion of a circular arc in contact with the linearly-formed circumferentially outer side surface of the radially extending portion, and
the circular arc is a circular arc that is in contact with both the linearly-formed circumferentially outer side surface of the radially extending portion and a concentric circle that is concentric with the shaft hole and is distanced from the shaft hole to a radially outer side by a predetermined distance that enables a minimum mechanical strength of the rotor core to be secured.

3. The rotor according to claim 2, wherein
the permanent magnet insertion portion is formed into a rectangular shape that extends long and narrow in the circumferential direction.

4. The rotor according to claim 3, wherein
a radially outer peripheral surface of the first circumferentially extending portion and a radially outer peripheral surface of the radially extending portion are made up of a portion of a circular arc that is concentric with the rotor core and in contact with the radially outer peripheral surface of the permanent magnet insertion portion.

5. The rotor according to claim 3, wherein
each of the plurality of magnet slots is partitioned into a plurality of parts at the permanent magnet insertion portion.

6. The rotor according to claim 2, wherein
the permanent magnet insertion portion is formed into a shape including the radially outer peripheral surface made up of a portion of a circular arc that is concentric with the rotor core and the radially inner peripheral surface made up of a portion of a circular arc that is concentric with the rotor core and has a smaller radius than that of the circular arc composing the radially outer peripheral surface.

7. The rotor according to claim 6, wherein
a radially outer peripheral surface of the first circumferentially extending portion and a radially outer peripheral surface of the radially extending portion are made up of a portion of a circular arc in contact with the radially outer peripheral surface of the permanent magnet insertion portion and the linearly-shaped circumferentially outer side surface of the radially extending portion.

8. A permanent magnet type rotating electrical machine, comprising:
a stator on which a stator winding is wound; and
a rotor according to claim 1, the rotor being arranged on an inner peripheral side of the stator in a freely rotatable manner.

9. A permanent magnet type rotating electrical machine, comprising:
a stator on which a stator winding is wound; and
a rotor according to claim 2, the rotor being arranged on an inner peripheral side of the stator in a freely rotatable manner.

10. A permanent magnet type rotating electrical machine, comprising:
a stator on which a stator winding is wound; and
a rotor according to claim 3, the rotor being arranged on an inner peripheral side of the stator in a freely rotatable manner.

11. A permanent magnet type rotating electrical machine, comprising:
a stator on which a stator winding is wound; and
a rotor according to claim 4, the rotor being arranged on an inner peripheral side of the stator in a freely rotatable manner.

12. A permanent magnet type rotating electrical machine, comprising:
a stator on which a stator winding is wound; and
a rotor according to claim 5, the rotor being arranged on an inner peripheral side of the stator in a freely rotatable manner.

13. A permanent magnet type rotating electrical machine, comprising:
a stator on which a stator winding is wound; and
a rotor according to claim 6, the rotor being arranged on an inner peripheral side of the stator in a freely rotatable manner.

14. The rotor according to claim 4, wherein
each of the plurality of magnet slots is partitioned into a plurality of parts at the permanent magnet insertion portion.

15. A permanent magnet type rotating electrical machine, comprising:
a stator on which a stator winding is wound; and
a rotor according to claim 14, the rotor being arranged on an inner peripheral side of the stator in a freely rotatable manner.

* * * * *